United States Patent
Gardes et al.

(10) Patent No.: US 9,494,741 B2
(45) Date of Patent: Nov. 15, 2016

(54) APPARATUS COMPRISING AT LEAST ONE OPTICAL DEVICE OPTICALLY COUPLED TO AT LEAST ONE WAVEGUIDE ON AN OPTICAL CHIP

(71) Applicant: University of Southampton, Southampton (GB)

(72) Inventors: Frederic Yannick Gardes, Southampton (GB); David John Thomson, Southampton (GB); Graham Trevor Reed, Southampton (GB); Harold Meng Hoon Chong, Southampton (GB); Scott Ashley Reynolds, Southampton (GB)

(73) Assignee: University of Southampton, Hampshire (GB)

( * ) Notice: Subject to any disclaimer, the term of this patent is extended or adjusted under 35 U.S.C. 154(b) by 0 days.

(21) Appl. No.: 14/392,048

(22) PCT Filed: Dec. 3, 2013

(86) PCT No.: PCT/GB2013/000524
§ 371 (c)(1),
(2) Date: May 22, 2015

(87) PCT Pub. No.: WO2014/087122
PCT Pub. Date: Jun. 12, 2014

(65) Prior Publication Data
US 2016/0018601 A1   Jan. 21, 2016

(30) Foreign Application Priority Data
Dec. 4, 2012   (GB) .................................... 1221847.5

(51) Int. Cl.
G02B 6/34 (2006.01)
G02B 6/30 (2006.01)
(Continued)

(52) U.S. Cl.
CPC . *G02B 6/30* (2013.01); *G02B 6/12* (2013.01); *G02B 6/34* (2013.01); *G02B 6/3636* (2013.01);
(Continued)

(58) Field of Classification Search
CPC ... G02B 6/4226; G02B 6/423; G02B 6/4243
USPC .............................................. 385/37, 52, 49
See application file for complete search history.

(56) References Cited

U.S. PATENT DOCUMENTS 5,488,678 A * 1/1996 Taneya ..................... G02B 6/42
372/50.1
5,557,695 A * 9/1996 Yamane ................... G02B 6/30
385/147
(Continued)

FOREIGN PATENT DOCUMENTS

EP        0846966 A2    6/1998

*Primary Examiner* — Ellen Kim
(74) *Attorney, Agent, or Firm* — Iandiorio Teska & Coleman, LLP

(57) ABSTRACT

Apparatus comprising at least one optical device (106) optically coupled to at least one waveguide (111) on an optical chip (100), characterized in that: (i) the optical device (106) is optically aligned with the waveguide (111) by aligning means (114, 116); (ii) the aligning means (114, 116) comprises at least one male member (114) and at least one female (116) member which locate together; (iii) one of the male member (114) and the female member (116) is positioned on the optical chip (100); (iv) the other one of the male member (114) and the female member (116) is positioned on a capping chip (102); and (v) the apparatus includes a mirror (108) for reflecting light from the optical device (106) to the waveguide (111).

10 Claims, 15 Drawing Sheets

(51) Int. Cl.
*G02B 6/36* (2006.01)
*G02B 6/42* (2006.01)
*G02B 6/12* (2006.01)

(52) U.S. Cl.
CPC .............. *G02B 6/423* (2013.01); *G02B 6/3652* (2013.01); *G02B 6/3692* (2013.01); *G02B 6/4214* (2013.01); *G02B 6/4224* (2013.01); *G02B 6/4269* (2013.01); *G02B 2006/12107* (2013.01)

(56) References Cited

U.S. PATENT DOCUMENTS

| | | | |
|---|---|---|---|
| 5,784,509 A | 7/1998 | Yamane et al. | |
| 6,848,839 B2* | 2/2005 | Steinberg | G02B 6/4239 385/65 |
| 6,928,205 B2* | 8/2005 | Ouchi | G02B 6/43 385/129 |
| 7,162,124 B1 | 1/2007 | Gunn, III et al. | |
| 7,355,162 B2* | 4/2008 | Sidorin | G01J 3/02 250/227.11 |
| 7,916,984 B2* | 3/2011 | Kim | G02B 6/423 385/129 |
| 8,027,553 B2* | 9/2011 | Takai | G02B 6/423 257/698 |
| 8,391,657 B2* | 3/2013 | Asahi | G02B 6/423 385/39 |
| 2002/0146217 A1* | 10/2002 | Nobuhara | G02B 6/30 385/84 |
| 2002/0164129 A1 | 11/2002 | Jackson | |
| 2003/0075790 A1 | 4/2003 | Steinberg et al. | |
| 2004/0057686 A1 | 3/2004 | Steinberg et al. | |
| 2004/0184156 A1 | 9/2004 | Gunn, III et al. | |
| 2011/0142395 A1 | 6/2011 | Fortusini et al. | |

* cited by examiner

A: Fibres
B: V-Groove Fibre Holder
C: Glass Block
D: Optical/Electronic chip
E: Electronic Ribbon Cable
F: PCB A: Glass
B: V-goove
C: Fibres
D: Glob Top A: Fibres
B: V-Groove Fibre Holder
C: Glass Block
D: Photonic/Electronic Chip
E: Electrical I/O Pins Total separation = 111μm
Beam spot = 24μm

*Fibre sunk 55.5μm into optical chip:*

Total separation = 52μm
Beam spot = 14μm

US 9,494,741 B2

APPARATUS COMPRISING AT LEAST ONE OPTICAL DEVICE OPTICALLY COUPLED TO AT LEAST ONE WAVEGUIDE ON AN OPTICAL CHIP

This invention relates to apparatus comprising at least one optical device optically coupled to at least one waveguide on an optical chip.

Apparatus is known comprising at least one optical device optically coupled to at least one waveguide on an optical chip. The optical device may be, for example, an optical fibre. The known apparatus suffers from a problem in optically aligning the optical device with the waveguide. More specifically, the known apparatus requires that active alignment is employed to position the optical device with respect to the waveguide in order to allow the required optical coupling. The active alignment means that whilst the optical device is being brought into position, the optical coupling has to be actively monitored by some means. This active monitoring is both time consuming and costly.

It is an aim of the present invention to reduce the above mentioned problem.

Accordingly in one non-limiting embodiment of the present invention there is provided apparatus comprising at least one optical device optically coupled to at least one waveguide on an optical chip, characterised in that:
  (i) the optical device is optically aligned with the waveguide by aligning means;
  (ii) the aligning means comprises at least one male member and at least one female member which locate together;
  (iii) one of the male member and the female member is positioned on the optical chip;
  (iv) the other one of the male member and the female member is positioned on a capping chip; and
  (v) the apparatus includes a mirror for reflecting light from the optical device to the waveguide.

The use of the aligning means in the apparatus of the present invention enables the optical device to be optically coupled to the waveguide with the required optical alignment. The aligning means avoids the need for the active alignment employed in the known apparatus. The aligning means provides a simple and cost effective alternative to the active aligning, and the aligning means thus enables photonics apparatus to be produced in less time and with less expense than previously known comparable apparatus requiring the use of active alignment.

The apparatus of the present invention is preferably be one in which the female member is positioned on the optical chip, and in which the male member is positioned on the capping chip. The reverse arrangement may be employed in which case the apparatus will be one in which the male member is positioned on the optical chip, and in which the female member is positioned on the capping chip.

The male member may be on the optical chip and may be formed of the material used for the top metal layer. In this case, the formation of the male member may be done at the same time as the electrodes are formed in this layer. Thus a single lithography step would be used to define the position of the electrodes and the male member.

The female member may be on the optical chip and instead of being a deep etch into the substrate, may be an etched hole in the top metal layer. In this case, the formation of the female member may be done at the same time as the electrodes are formed in this layer. Thus a single lithography step would be used to define the position of the electrodes and the female member.

The optical device may be located in a groove in the capping chip. Preferably the groove is a V-shaped groove. Other shaped grooves may be employed.

The optical device may be an optical fibre or a laser. Other types of optical device may be employed.

The male member is preferably made of a silicon nitride. Example of other materials that may be employed for the male member are silicon dioxide, silicon and aluminium.

The apparatus may be one in which the optical device is coupled to the waveguide in the plane of the waveguide.

Alternatively, the apparatus of the present invention may be one in which the optical device is coupled to the waveguide out of the plane of the waveguide. In this case, the apparatus may include a grating for coupling the optical device to the waveguide.

Embodiments of the invention will now be described solely by way of example and with reference to the accompanying drawings in which:

FIG. 1 shows part of known apparatus in which an optical device in the form of an optical fibre is coupled to a waveguide on an optical chip, and in the plane of the waveguide;

FIGS. 2a, 2b, and 2c show part of known apparatus utilising coupling in the plane of the waveguide as shown in FIG. 1;

Figure 4:
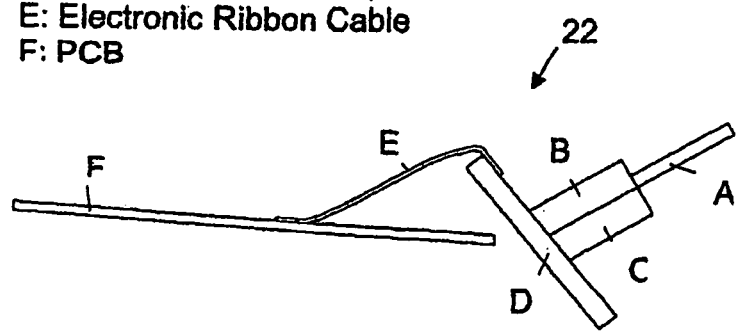
FIG. 4 is a perspective view of part of known commercially available apparatus utilising out-of-plane coupling as shown in FIG. 3.
Figure 5A:
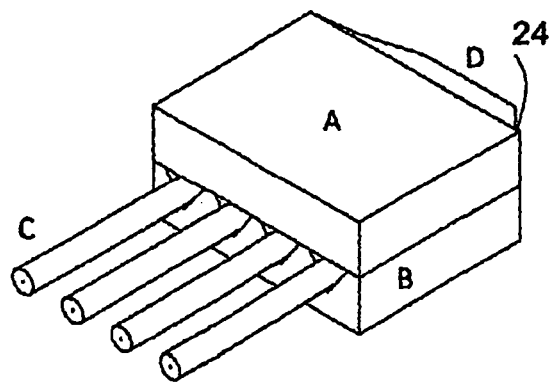
Figure 5B:
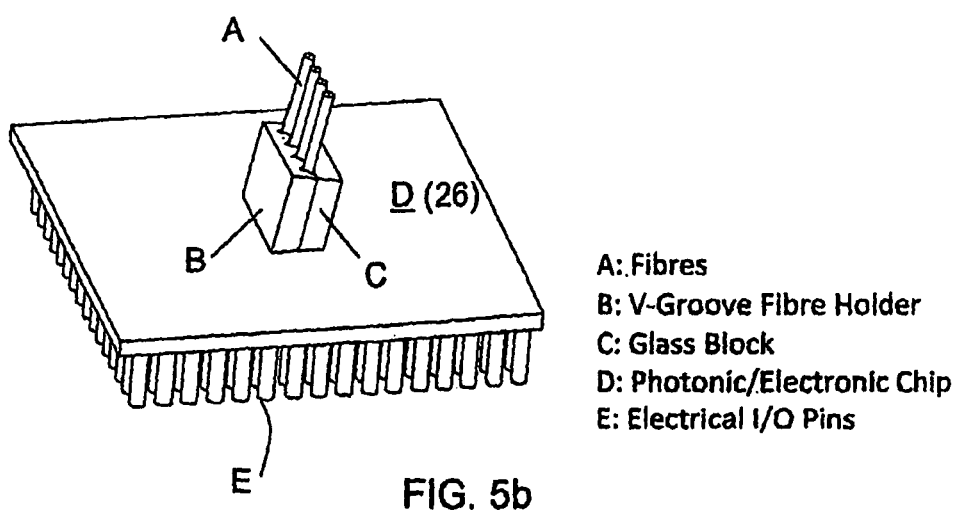
Figure 6A:
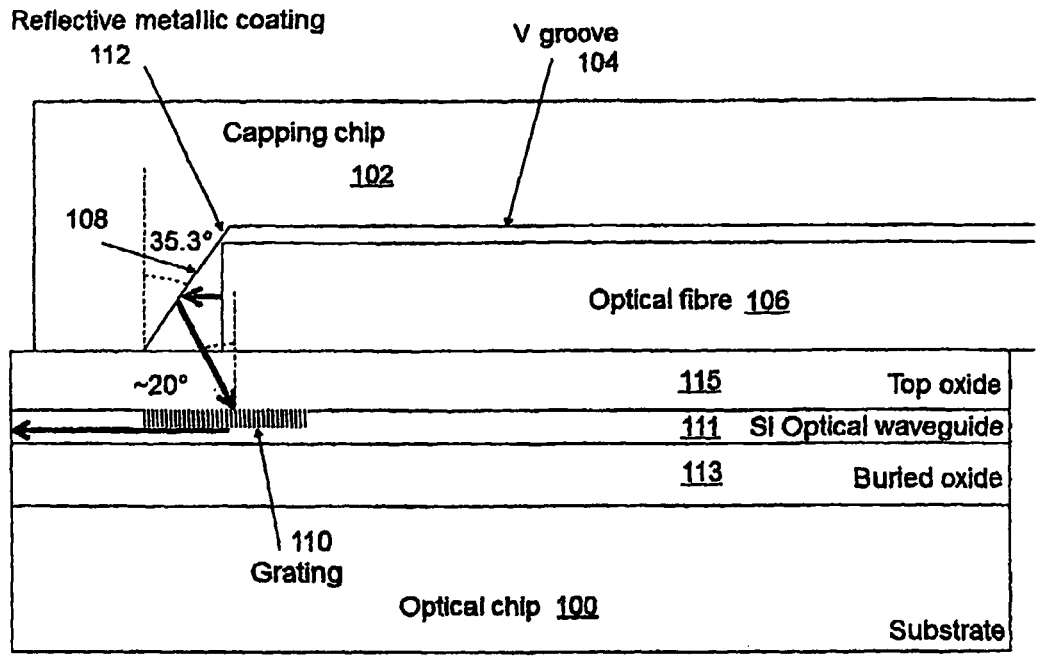
Figure 6B:
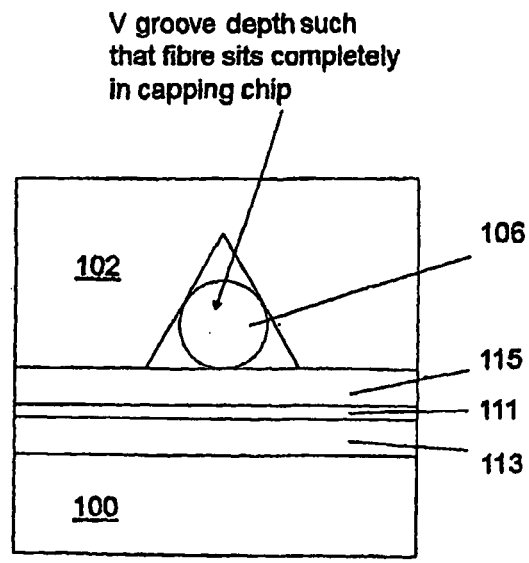
Figure 7:
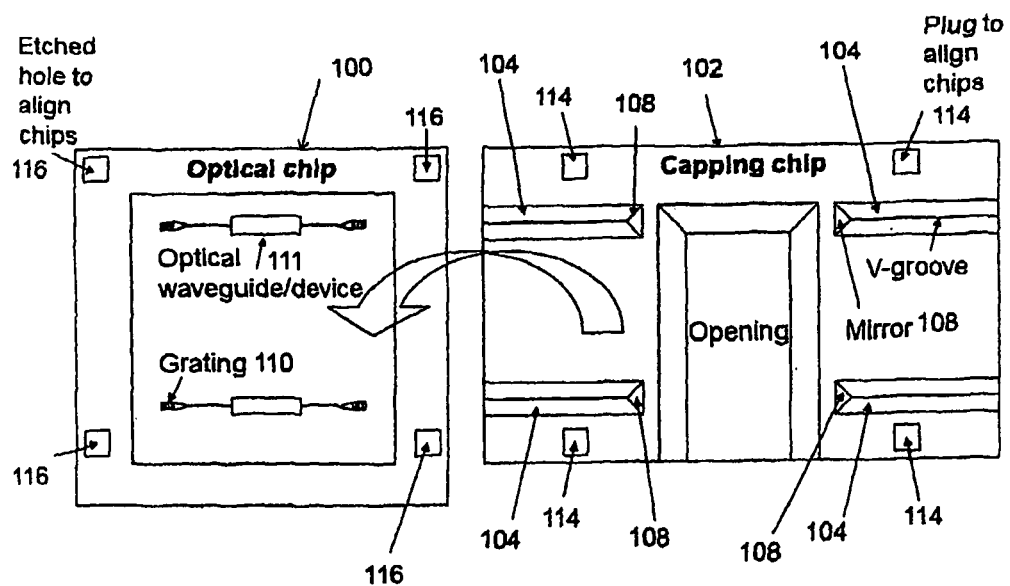
Figure 8A:
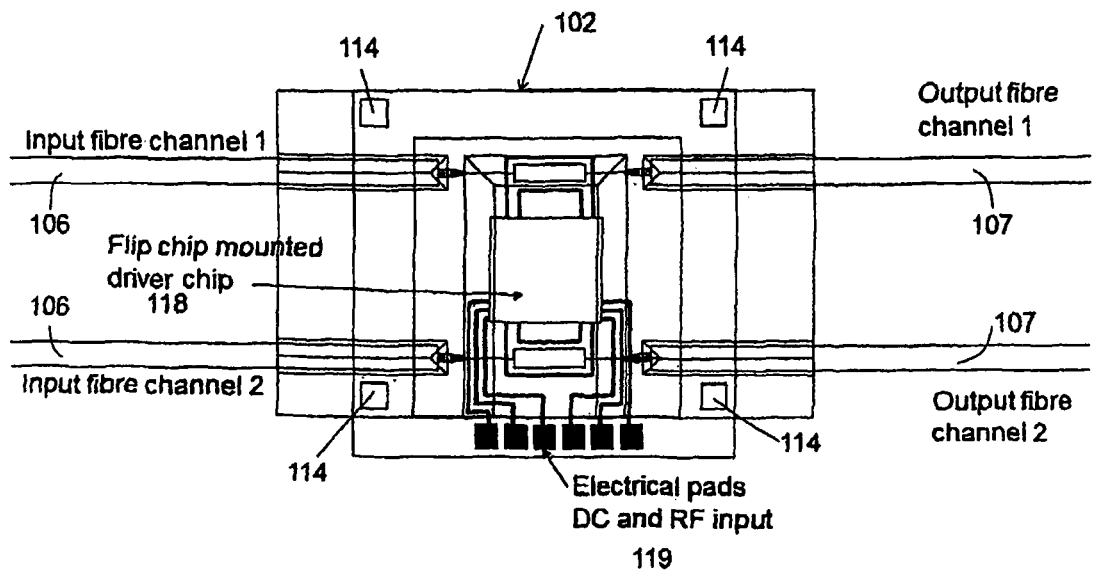
Figure 8B:
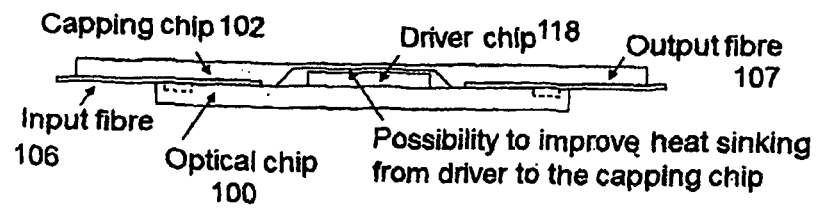
Figure 9A:
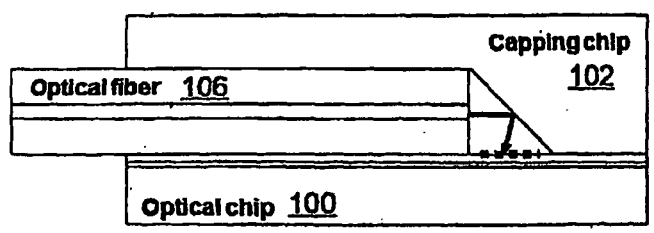
Figure 9B:
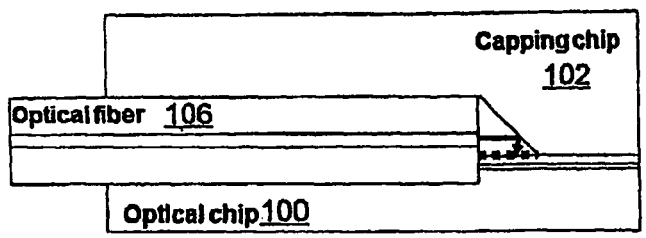
Figure 10:
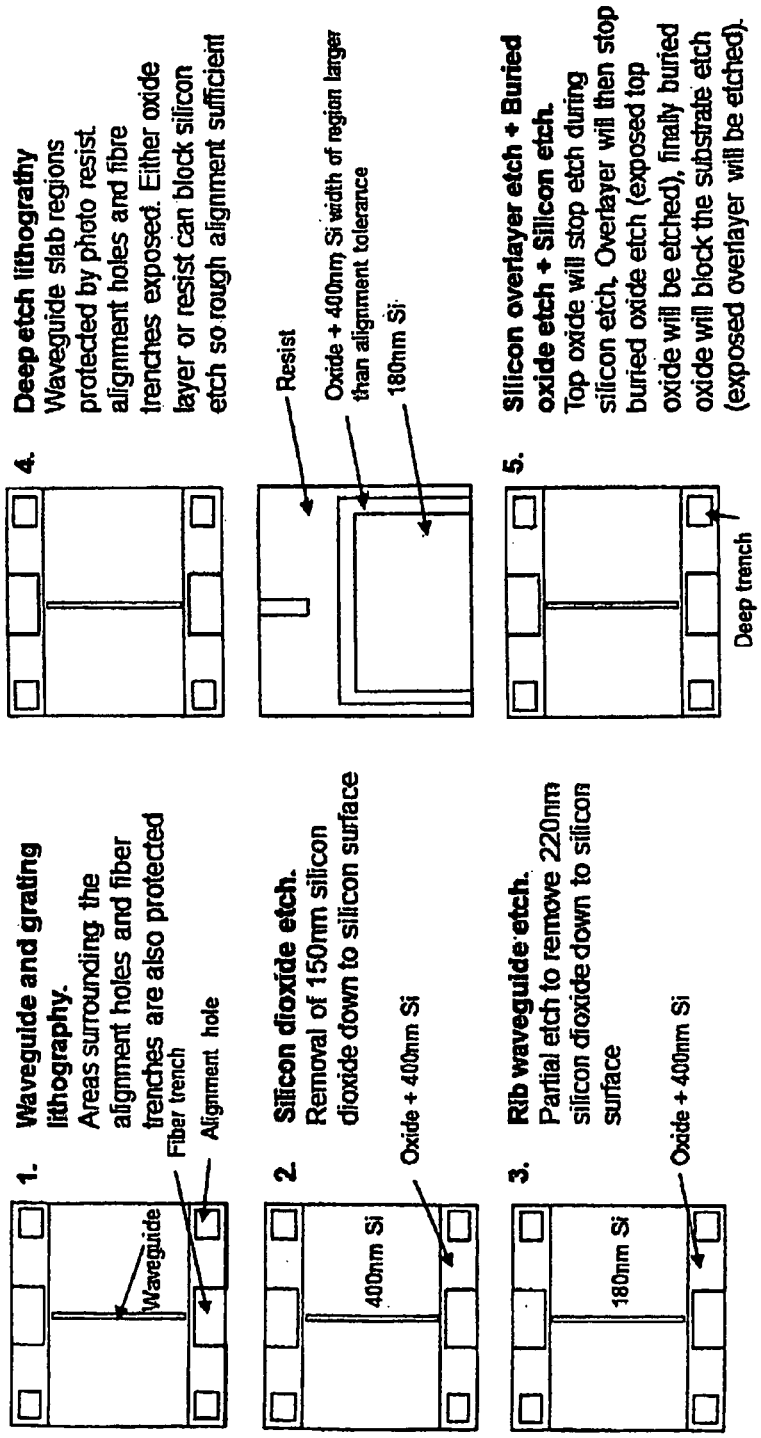
Figure 11A:
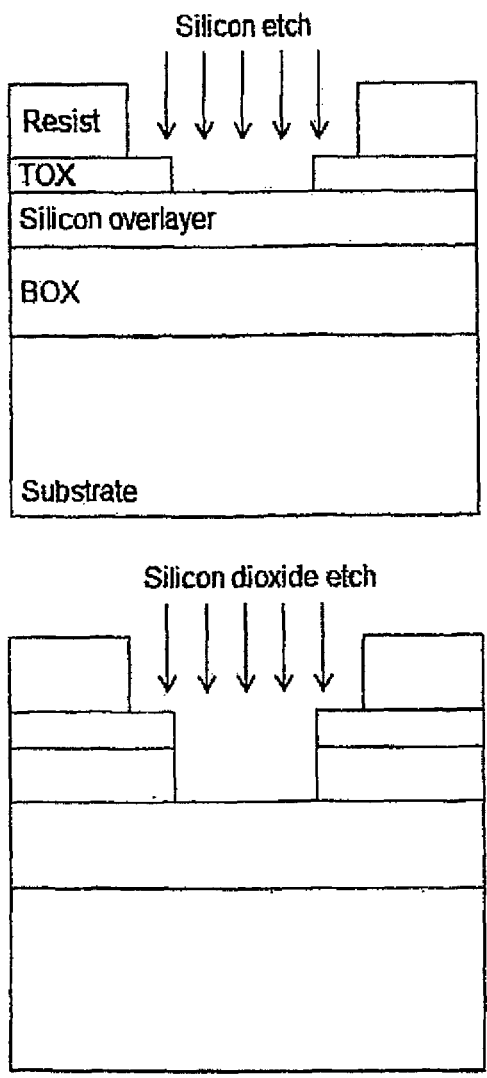
Figure 11B:
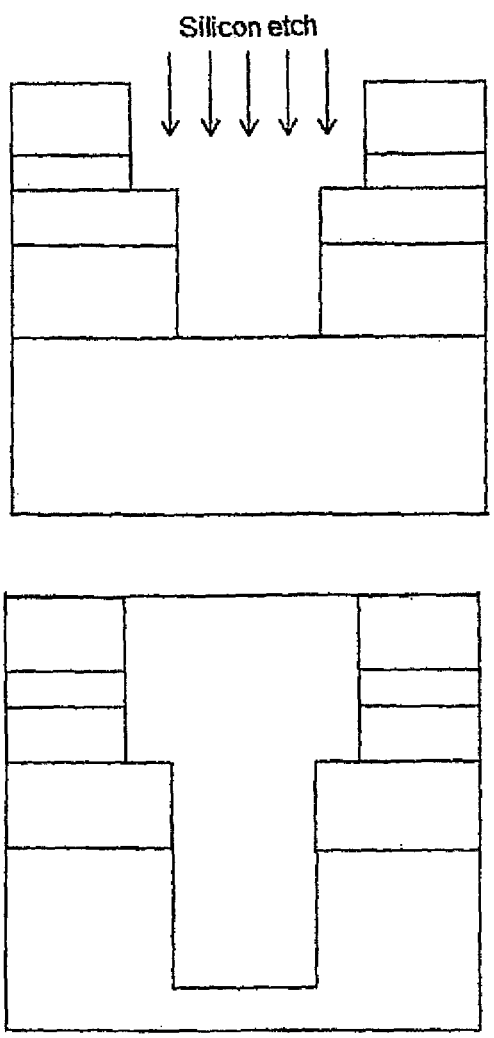
Figure 12A:
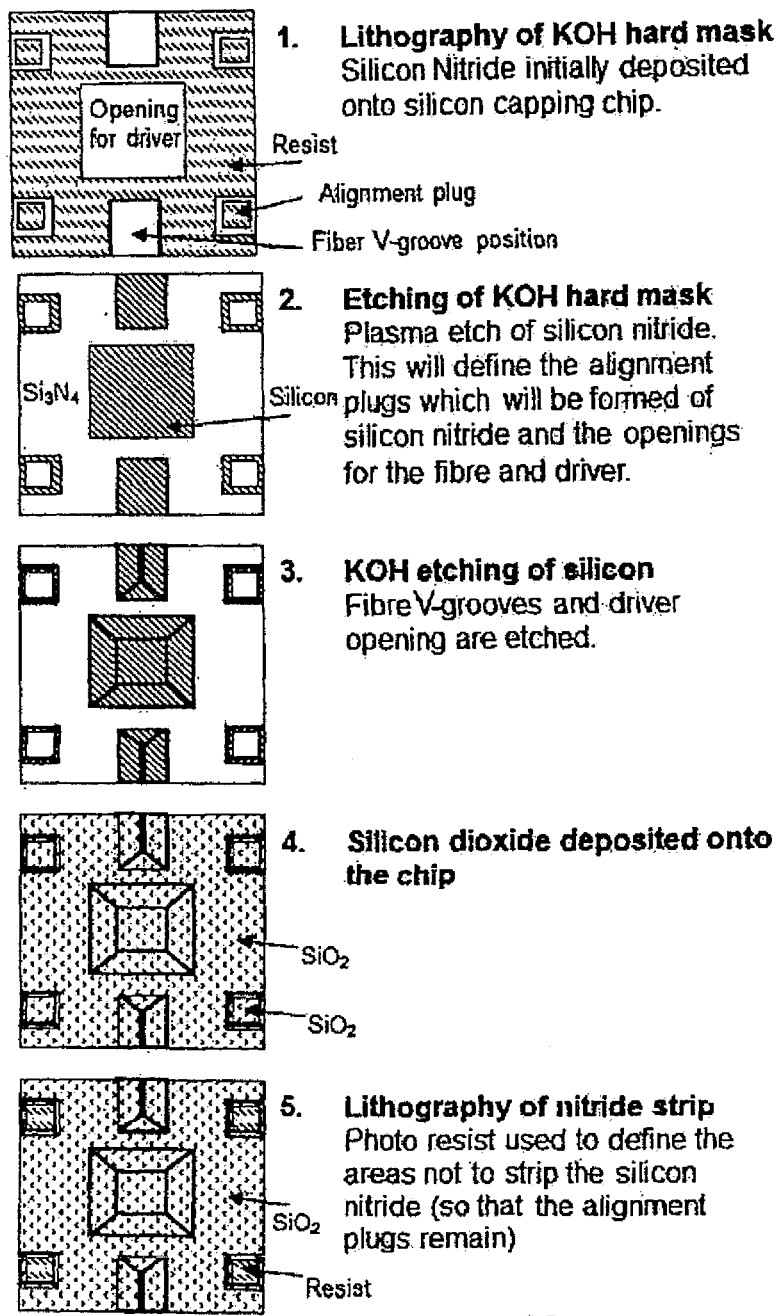
Figure 12B:
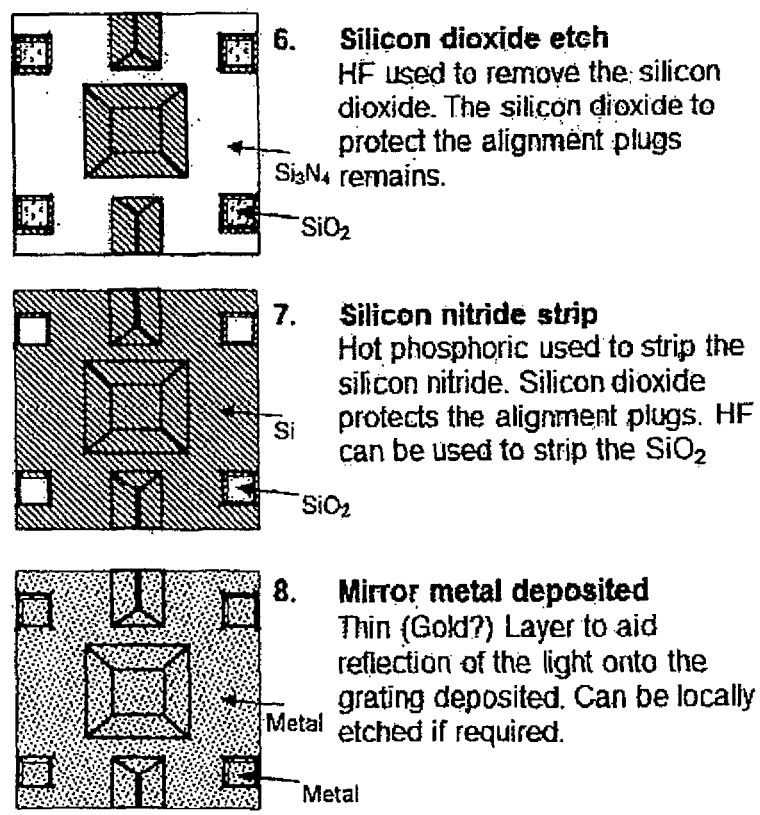
Figure 13A:
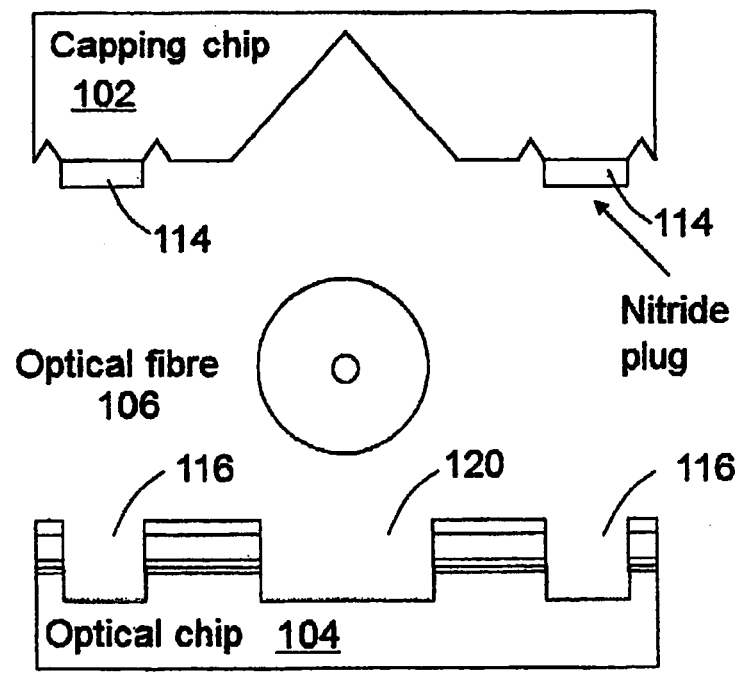
Figure 13B:
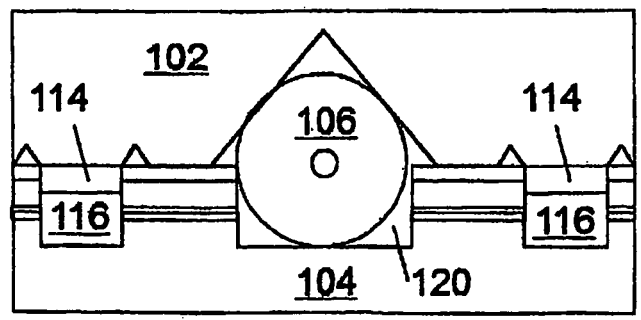
Figure 14:
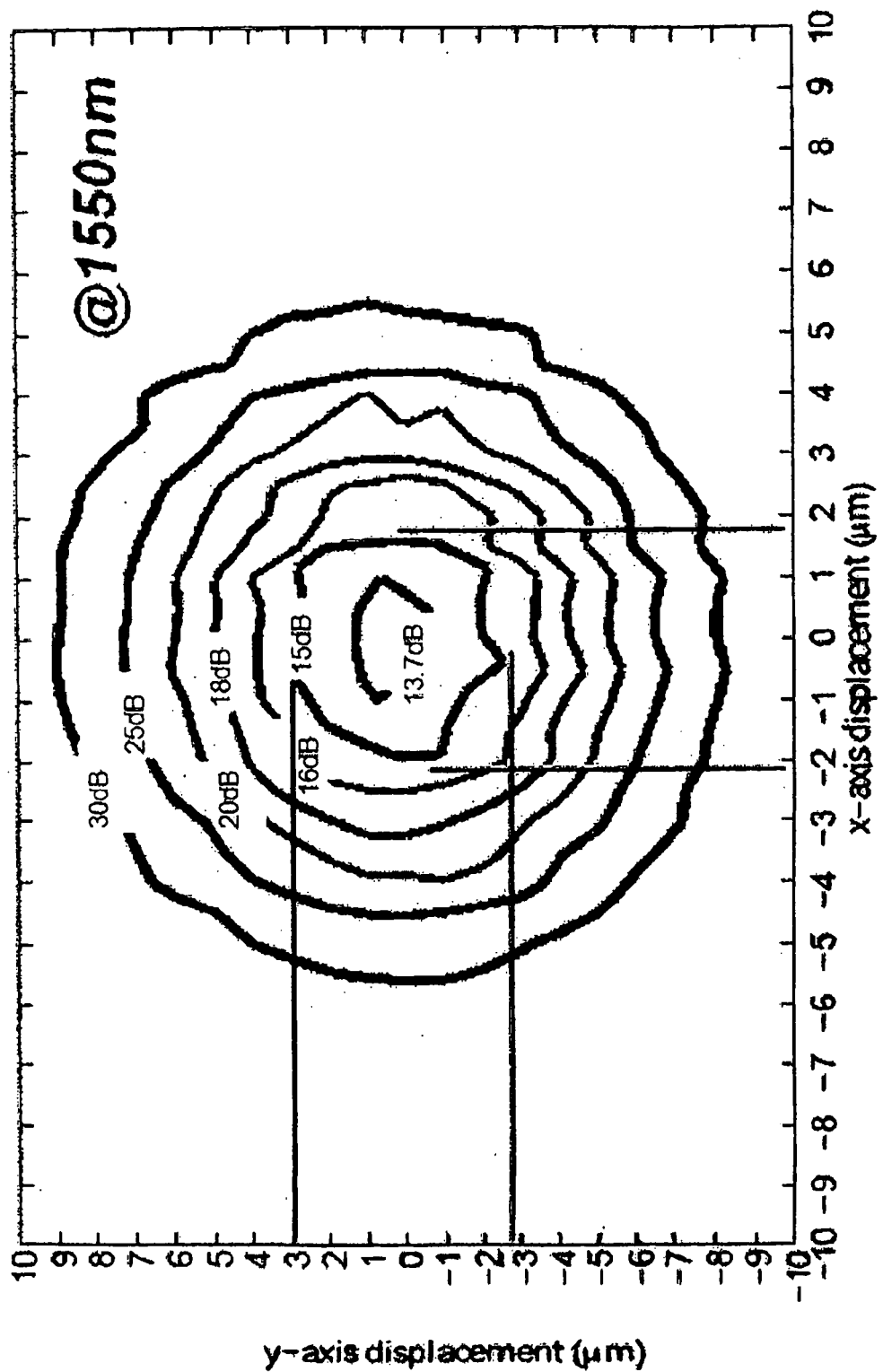
Figure 15A:
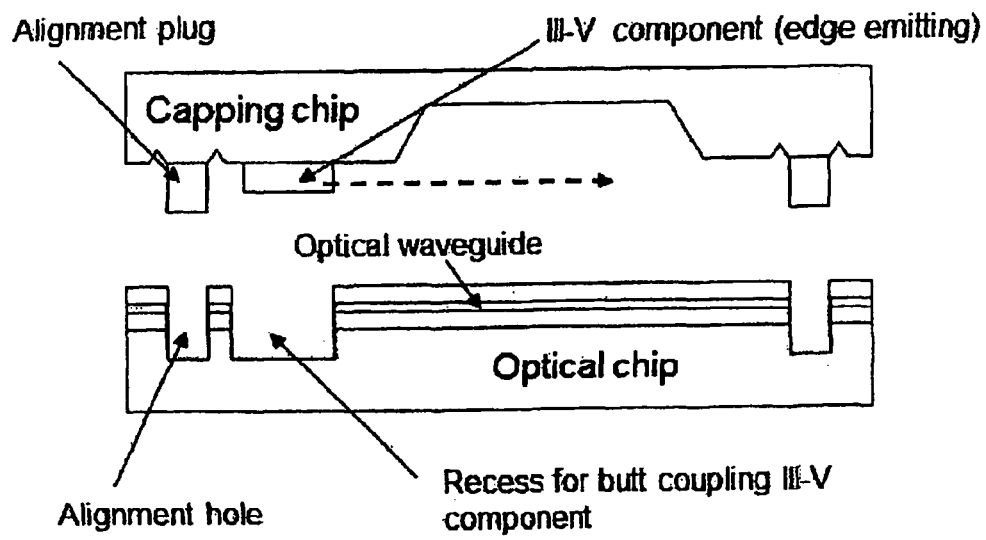
Figure 15B:
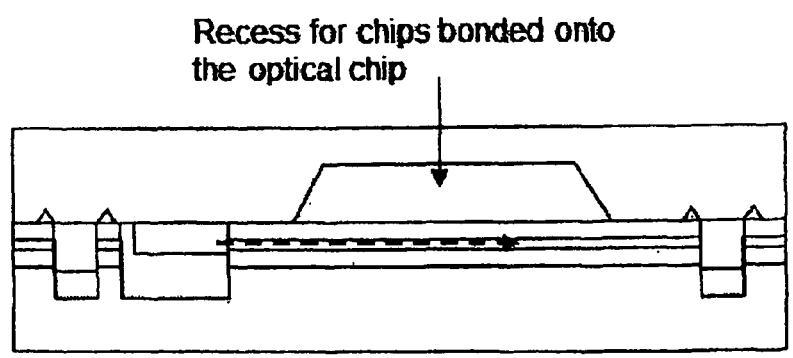
Figure 16:
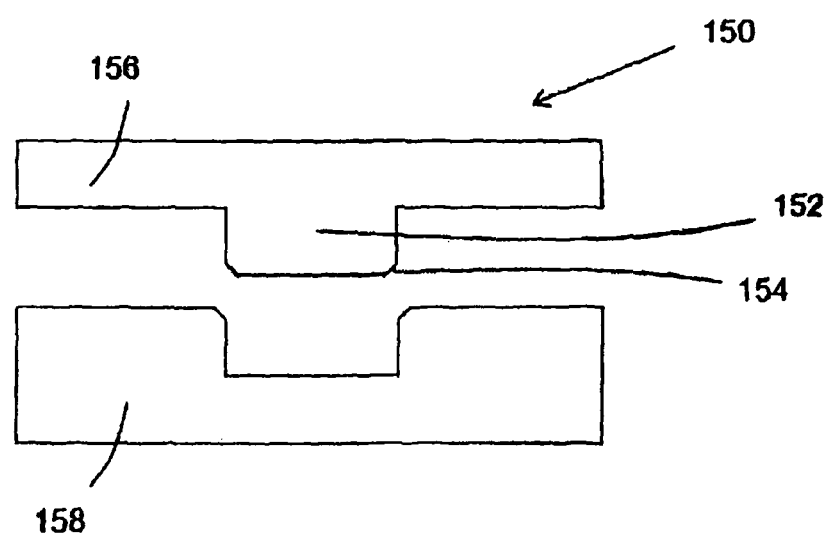

FIGS. 5a and 5b shown two additional chips that are required by the part of the apparatus shown in FIG. 4;

FIG. 6a is a side view of first apparatus of the present invention and comprising an optical device in the form of an optical fibre optically coupled to a waveguide on an optical chip;

FIG. 6b is an end view of the apparatus as shown in FIG. 6a;

FIG. 7 shows the optical chip and a capping chip as used in the apparatus of FIGS. 6a and 6b, in a separated form and illustrates the Use of aligning means in order to optically align the optical device with the waveguide;

FIG. 8a shows the assembled optical chip and the capping chip shown in FIG. 7;

FIG. 8b is a cross sectional view through the assembly shown in FIG. 8a;

FIGS. 9a and 9b illustrate the benefit of sinking the optical fibre shown in FIGS. 6a-8b slightly into the optical chip;

FIG. 10 illustrates in different steps the formation of alignment holes forming a female member part of the aligning means, and further illustrates the formation of a trench for the optical fibre;

FIGS. 11a and 11b illustrate a deep etch step formed on the optical chip;

FIGS. 12a and 12b illustrate steps in providing self-aligning male member formations on the capping chip shown in FIGS. 6a-8b;

FIGS. 13a and 13b are respectively separated and assembled cross sectional views of the apparatus shown in FIGS. 6a-8a, and illustrate the operation of the alignment means in the form of two male members on the capping chip and two female members on the optical chip;

FIG. 14 shows a typical transmission through an optical circuit with different misalignments of an optical fibre to the grating;

FIGS. 15a and 15b are separated and assembled cross sectional views like FIGS. 13a and 13b but showing second apparatus of the present invention; and FIG. 16 shows part of third apparatus of the present invention.

Referring to the drawings, a significant issue in any photonic application is the light loss caused when coupling from an optical device, for example an optical fibre, to a semiconductor based waveguide. In a laboratory environment, losses can be minimised through the use of expensive lenses and accurate positioning stages. Even in the laboratory environment, achieving optimal alignment is time consuming and requires an experienced operator. In a commercial environment such approaches are impractical. In a commercial environment, ease and accuracy of optical alignment are essential. In a commercial environment, the optical alignment has to be such that it is not time consuming and costly. In addition, ideally, the optical coupling should achieve the following:

Provide low optical coupling loss
Provide coupling over a broad wavelength range
Not be sensitive to input polarisation
Require simple fabrication and optical chip preparation
Allow for wafer scale testing
Allow a conveniently shaped and sized final solution Known methods for coupling light from an optical fibre to a waveguide can be grouped into two types, i.e. in-plane and out-of-plane. Examples given below are for silicon based photonic waveguides but the present invention can also be applied to other photonic materials.

Figure 1:
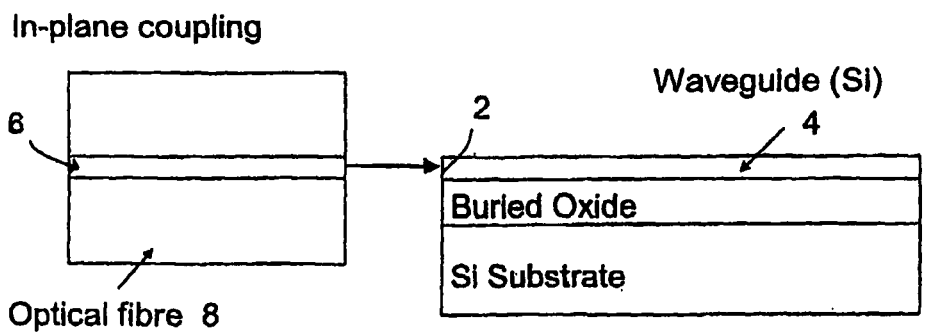

FIG. 1 shows in-plane coupling (or butt coupling as it is also known). This in-plane coupling involves coupling the light into the end facet 2 of a waveguide 4. The end facet 2 is normally prepared by polishing or cleaving to ensure an optically smooth surface through which the light is passed. The core 6 of a standard optical fibre 8 is approximately 8.2 µm in diameter. This is much larger than most of the silicon waveguides used nowadays which have thicknesses of the order of 400 nm or less. The mode mismatch is significant and therefore conventional in-plane coupling can lead to losses of up to 20 dB per facet. Lenses can be used to focus the light onto the end facet 2, but these are both expensive and require precise alignment. Use in a commercial application is therefore impractical. Anti-reflection coatings are also often required on the waveguide facets.

Figure 2:
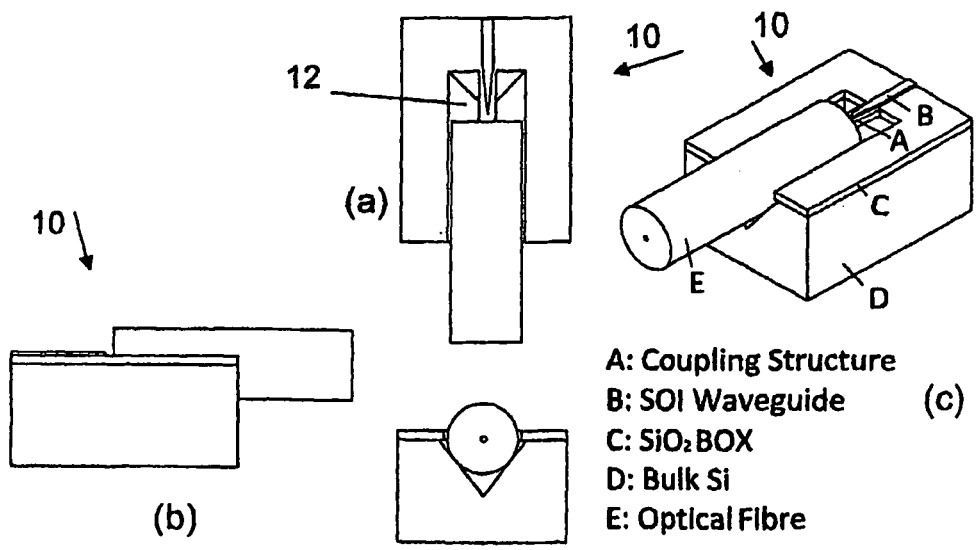

The most successful in-plane coupling approach to small waveguides to date is the so-called "inverse taper". The inverse taper involves narrowing the waveguide towards the edge of the chip in order to force the optical mode out of the waveguide and into a cladding waveguide, causing the optical mode to enlarge in the process and thus allowing better mode matching with that of the optical fibre. Although losses down to 1 dB have been reported, the fabrication of the waveguide narrowing region (which is usually significantly less than 200 nm) is critical to achieve high performance. The tolerances to alignment are also poor. In terms of packaging, the use of V-grooves is quite common with both in-plane and out-of-plane coupling. FIG. 2 shows by way of example, a diagram of a V-groove and inverse taper combination 10 as proposed by J. V. Galan, P. Sanchis, J. Marti, S. Marx, H. Schröder, B. Mukhopadhyay, T. Tekin, S. Selvaraja, W. Bogaerts, P. Dumon and L. Zimmermann, "CMOS compatible silicon etched V-grooves integrated with a SOI fiber coupling technique for enhancing fiber-to-chip alignment", in *IEEE Group IV Photonics*, 2009.)

The V-groove 12 fixes a set position for the optical fibre 14 to sit in and to be bonded. The fabrication of the V-groove 12 may be performed by an anisotropic etch which etches different crystal planes at different rates. One example is a chemical etch using potassium hydroxide (KOH), where a 100 crystal orientated silicon wafer with square openings in a hard mask will result in angles etched at 54.7°. The etch will stop when the two sidewalls meet, so that the depth of the etch can be defined with some precision by the width of the opening in the mask. In silicon processing, this width can be defined with an accuracy better than 10 nm even in low specification facilities.

Figure 3:
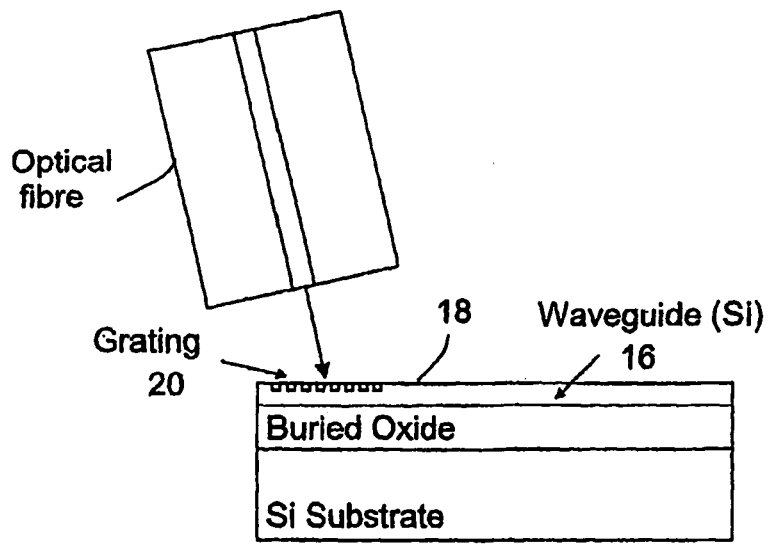
FIG. 3 shows part of known apparatus in which an optical device in the form of an optical fibre is optically coupled to a waveguide on an optical chip, and out of the plane of the waveguide.

FIG. 3 shows how out-of-plane coupling involves coupling the light not into the end of a waveguide 16, but into one of the other surfaces, usually the top surface 18 of the waveguide 16. The most commonly used structure to facilitate coupling into the top surface 18 of the waveguide 16 is a grating 20 which is etched into the top surface 18 as shown in FIG. 3. Other methods can be used to form a grating also. One commonly used grating design involves an etch of 70 nm into a waveguide of thickness 220 nm. The period of the grating is 630 nm and the mark space ratio is 1:1. This means that the feature size is 315 nm, which is achievable with DUV-248 (Deep Ultraviolet-248), a relatively inexpensive lithography option. This standard design offers a coupling efficiency of 37%. However modifications can be made to increase the efficiency, in some cases at the expense of fabrication complexity. Luxtera, Inc. of Carlsbad, Calif., United States of America claim a coupling loss of 1 dB from their design, putting the grating coupling loss on a par with the inverse taper.

Gratings also offer the prospect of polarisation diversity. This removes the requirement to couple light of a certain polarisation or the development of components with polarisation independent performance, and therefore simplifies the assembly task. Gratings which offer polarisation diversity consist of two dimensional periodic structures. The grating coupler and inverse taper can be considered the best of the out-of-plane and in-plane coupling types respectively. The following Table 1 summarises the important metrics of the coupling technique.

TABLE 1

| | Grating Coupler | Inverse Taper |
|---|---|---|
| Coupling loss | 1 dB | 1 dB |
| Alignment tolerance | ±2 µm = 1 dB | ±1.2 µm = 1 dB |
| Febrication complexity | Low | High |
| Polarisation Alignment | Polarisation diversity | Each component requires polarisation independent operation |
| Optical bandwidth (1 dB) | ~40 nm | >100 nm |
| Possibility of wafer scale testing | High | Low |
| Ease of packaging | Low | High |

It can be seen from Table 1 that the grating coupler is superior or equal in performance to the inverse taper in all metrics other than the optical bandwidth and the ease of packaging. The optical bandwidth required from the coupler is obviously only important where a broad wavelength range is required. One example application is in wavelength division multiplexing (WDM). For example; 16 channel silicon Arrayed Waveguide Gratings (AWGs) have been demonstrated with a Free Spectral Range (FSR) of 25.3 nm, fitting easily within the 1 dB bandwidth of the grating.

Another problem of the grating is the ease of packaging. The primary issue is that the optical fibre has a typical approach angle of 7° from the normal to the sample surface. This creates an assembly issue. The most advanced solution has been used in a device 22 manufactured by Luxtera and shown in FIG. 4. In FIG. 4, it can be seen that the fibres have been mounted onto the optical chip at the required angle, which is just off perpendicular to the product surface. This assembly is complex, and non-standard. Also the final footprint of the overall device 22 is large as the device 22 extends in all three dimensions.

Other similar known solutions to FIG. 4 have been demonstrated within the European EPIXNET program and are shown in FIGS. 5a and 5b. In these FIGS. 5a and 5b, two additional chips 24, 26 are used to produce the overall package. This also appears to be the ease with Luxtera device 22 shown in FIG. 4. A V-groove chip is used to mount and position the fibres.

The above prior art shown in FIGS. 1-5b demonstrates that the construction of all known apparatus comprising an optical device optically coupled to a waveguide requires active alignment for the optical coupling.

The following embodiments of the present invention show how to overcome the above mentioned problem, and to provide an elegant and low cost packaging solution.

Referring to FIGS. 6a and 6b, there is shown an embodiment of the present invention that combines the advantages of grating couplers with the more elegant and compact packaging schemes achievable with in-plane coupling, and in so doing uses passive alignment.

In FIGS. 6a and 6b, there are shown an optical chip TOO and a capping chip 102. The capping chip 102 has V-grooves 104 which hold input optical fibres 106 and output optical fibres 107 in position. A mirror 108 reflects the light down onto a grating 110. These features can be formed simultaneously using one anisotropic etch step, for example using KOH. A KOH etch through an rectangular opening with sides aligned to the crystal plane on a 100 silicon wafer, will etch on all sides with a side wall angle of 54.7°. The mirror 108 formed in this way will reflect light downwards such that it is incident on the grating 110 at an angle 20° from normal to the surface of the optical chip 100. A thin metallic layer 112 such as a gold layer, can be used to improve the reflection efficiency of the mirror. A simple grating 110 can be designed to couple approaching light effectively at, for example, −20° into a waveguide in the form of a silicon optical waveguide 111, demonstrating a theoretical efficiency of around 70%, (1.5 dB loss). There is potential to improve this coupling efficiency further with different designs. The silicon optical waveguide 111 is positioned between a buried oxide layer 113 and a top oxide layer 115.

Referring to FIGS. 7, 8a and 8b, in order to guide the assembly of the optical chip 100 and the capping chip 102, and therefore to require only passive alignment, male members in the form of pins 114 are formed on the capping chip 102, and female members in the form of holes 116 are formed on the optical chip 100. The pins 114 and holes 116 fit together in only one position and they constitute aligning means. The opposite arrangement for the positioning of the pins 114 and holes 116 may be employed. FIG. 7 shows the optical chip 100 and the capping chip 102 separated from each other. FIG. 8a shows the optical chip 100 and the capping chip 102 assembled. FIG. 8b is a section through the assembly shown in FIG. 8a. The capping chip 102 may cover the optical chip 100 where the coupling takes place with all the optical inputs 106 and the outputs 107 on one side. Alternatively, the capping chip 102 may cover the entirety of the optical chip 100 and therefore completely enclose the optical chip.

Also shown in FIGS. 8a and 8b is the encapsulation of an electronic driver chip 118 having electrical pads DC and RF input 119. Often other chips are required to be bonded with the optical chip 100, for example a III-V source chip or a modulator driver chip. FIG. 8 shows how this can be incorporated into this packaging scheme and in fact, the encapsulation could also be beneficial to the overall performance. The capping chip may aid sinking of the heat from a source or a driver which would normally dissipate through the optical chip, possibly varying the performance of the optical components. The capping chip also provide a sealed environment within which the chip can operate which could aid device lifetime. The same etch step that is used to form the V-groove and mirror, can be used to create a recess in the capping chip which would allow for the bonded chips to sit also under the capping chip. Silicon wafers at thicknesses above a few millimeters can be sourced if the bonded chip is especially thick. The KOH etch stops when the two crystal planes meet. This means that if a deeper opening is required for the bonded chip, the fibre V-groove dimensions will remain fixed by the width of the opening in the etch mask.

The expected beam spot size, after propagating from the optical fibre to the mirror and from the mirror to the grating, is able to be calculated knowing the divergence of the light from a standard single mode optical fibre (SMF-28). The efficiency of the grating is generally increased if the spot size is smaller. FIGS. 9a and 9b demonstrate that by recessing the optical fibre into the optical chip slightly, the distance between the optical fibre and the grating is decreased. This results in a much smaller spot size.

The formation of the trench required to lower the fibre does not involve any additional fabrication effort since a deep etch is already required to form the alignment holes into which the alignment plugs on the capping chip will reside for assembly, although control of the depth of the hole needs to be more precisely monitored, for example through end point control.

Alternatively the trench required to lower the fibre and alignment holes can be etched through the entire thickness of the optical chip. In this case, it would be possible to see the capping chip through the holes and trenches on the optical chip during the assembly of the two chips, which would aid alignment. The optical fibres can be inserted into the V-groove before or after the two chips are assembled. In this case, the requirement for a precise etch depth is removed along with one possible cause of misalignment. However, some other means is required to fix the optical fibres in the V-grooves. This other means may be, for example, the use of a clamp or adhesive which could be applied before or after the optical fibres are inserted. Another advantage of this approach is that wafer scale assembly can be used where a wafer containing several optical chips can be assembled with a wafer containing several capping chips, and then dicing into individual chips can be performed afterwards. Only one step for aligning the alignment plugs and alignment holes for several chips is therefore required. Furthermore, one set of alignment plugs and holes can be used per wafer, which would save on space on the optical chip. The optical fibres may then be inserted. Since the fibre is now held in the V-groove alone, the width of the etched fibre trench does hot have to tightly fit the optical fibre, which may aid the insertion of the optical fibre as well as the fixing of the fibre in the V-groove. On the other hand, a tightly fitting trench might still be preferred and the end of the trench nearest the mirror is useful to provide an accurate fibre stop.

The formation of the features on the optical chip 100 and capping chip 102 may be formed using the very precise alignment tolerances of standard CMOS processes. Alternatively the following self-aligned processes can be used to ensure that the feature routinely appear in exactly the positions required. These self-aligned processes may also prove more cost effective since lower specification fabrication facilities with larger alignment tolerances may be used. FIG. 10 depicts the optical chip formation process.

In a modification, the mirror may start a little lower down (i.e. with a step for the optical fibre to butt against), so that the mirror is closer to the fibre and the resulting illumination spot on the Bragg grating is even smaller.

Referring to FIGS. 11*a* and 11*b*, a thin top silicon dioxide layer (TOX) is deposited onto the wafers. The waveguide/ grating pattern and region around alignment hole/fibre trench is protected with photoresist during a silicon dioxide etch which exposes the silicon overlayer. The photoresist is then stripped and the patterned oxide layer used as a hard mask through which to etch the waveguides, gratings and start of the deep trenches. If rib waveguides are required, a partial etch is performed. A photoresist layer is then approximately aligned to protect the silicon surface everywhere except where the deep trenches are to be situated. Since the TOX layer is still surrounding the deep trench region, the resist does not need to extend exactly to the edges as either the resist or the thin oxide is sufficient to prevent the etch of the remaining silicon overlayer. This process is therefore self-aligned. In a similar fashion, the overlayer itself together with the resist can be used to define the hole through which to etch the buried oxide (BOX). Finally the buried oxide together with the resist can be used to etch the substrate to the required depth.

The formation of the features on the capping chip can also be self-aligned, meaning that precise alignment of the features on the capping chip and the optical chip is all performed using self-aligned processes. The process used to self-align the features on the capping chip is shown in FIGS. 12*a* and 12*b*.

The features are first patterned into a silicon nitride hard mask. The openings in the mask are etched with an anisotropic etchant such as KOH, forming the V-groove, mirror and recess for any bonded chips. The alignment plugs are to be formed within this thick silicon nitride hard mask and therefore the nitride is retained in these regions and stripped everywhere else. This is done by depositing and patterning a silicon dioxide layer over these regions. A gap between the alignment plug and surrounding silicon nitride formed in the first step ensures that only approximate alignment is required for this step. After stripping the silicon dioxide, a thin metal layer can be deposited to enhance the mirror performance. A cross-sectional diagram of an assembly of a capping chip 102, an optical fibre 106 and an optical chip 104 is shown in FIG. 13.

The two drips 102, 104 may be held together by a clamp, by an adhesive or by other means. In all of the Figures, the alignment pins 114, alignment holes 116 and fibre trench 120 have been shown with straight and vertical side walls. It may however be advantageous to have different shape and angled etch profiles. For example, an angled sidewall on the nitride pin 114 might help to guide the pin 114 into its alignment hole 116. Another solution could see the top half of the pin 114 angled and the bottom half vertical such that it is guided into its hole 116 with the top half and then snuggly fits in the bottom half. Rectangular or square shapes have been shown as the alignment features, but different shapes such as circular shapes may also be used, see for example FIG. 16.

It should be noted there are other combinations of process steps possible to produce the structures as shown or similar, and in order to provide the same operation.

Since the parts of the aligning means self-align to each other according to the present invention, the possible magnitude of misalignment to the grating 20 is greatly reduced. The following causes of misalignment still need to be considered:

(1) Variations in the size of the optical fibre
(2) Variations in the concentricity of the optical core in the optical fibre
(3) Variations in the etch depth of the fibre trench on the optical chip
(4) Misalignment of the features on the capping chip to the crystal plane
(5) Thermal expansion and differences in thermal expansion between the optical fibre and the two silicon chips
(6) Mismatch of sizes of the features on the optical and capping chips.

Considerations of the misalignment causes (1)-(6) above are as follows.

(1) And (2)

According to a typical Corning data sheet, the diameter of the optical fibre cladding is 125 µm+/−0.7 µm and the core cladding concentricity is <0.5 µm. This means that the fibre hole has to be 125.7 µm wide. The core of a fibre with diameter 124.3 µm would therefore be able to move 0.7 µm from side to side (horizontal). The fibre could also potentially sit 0.7 µm too low (vertical).

(3)

The accuracy of the depth of the trench 120 can be controlled by employing interferometric end point control during fabrication. This allows accuracy of better than 0.5%. The depth of the deep etch required for the fibre trench 120 is approximately 60 µm. The variation in etch depth is therefore less than +/−300 nm (vertical).

(4)

Misalignment of the silicon nitride etch mask to the wafer crystal plane can be problematic as the KOH etch will find the correct alignment to the crystal plane which could cause undercutting of the etch mask and therefore a broadening and deepening of the V-groove. The direction of the crystal plane is indicated by the notch or flat on the silicon wafer and the main problem is that the notch/flat is defined with an accuracy of only +/−1°. On a 1 mm long V-groove this would cause the V-groove to broaden by approximately 17.5 µm, and the centre to be offset by 9 µm, which is clearly unacceptable. There are methods to reduce the angular misalignment to better than +/−0.05" using an initial step to indicate the crystal plane direction. This reduces the broadening to 900 nm and the offset to within 500 nm (horizontal) and 700 nm (vertical). Methods to further improve the alignment can also be sought. However the misalignment of the horizontal direction of the optical fibre will be kept in position by the fibre trench removing this misalignment.

(5)

The coefficients of thermal expansion of the different materials used is $3.3e^{-6}$ per ° C. for silicon nitride, $2.6e^{-6}$ per ° C. for silicon and $5.5e^{-7}$ per ° C. for the optical fibre. Both the capping chip and the optical chip are made of silicon and therefore should expand and contract in a similar fashion with temperature. If the nitride plug is 50 μm square, it will expand in size by approximately 9 nm (+/−4.5 nm) (vertical and horizontal) over 100° C. and therefore the holes should be made larger by this amount to accommodate this. Misalignment from this source of error is clearly very small. Finally the expansion of the optical fibre in the V-grove will cause the core to move by just 6 nm (+/−3 nm) (vertical) over a 100° C. temperature range.

(6) Using standard lithography, the features on the optical and capping chip can normally be defined with 50 nm accuracy (horizontal).

Therefore the total worst case misalignment is:

Vertical: +/−(1) 700 nm+/−(2) 500 nm+/−(3) 300 nm+/−(4) 700 nm+/−(5) 74.5 nm+/−2207.5 nm.

Horizontal: +/−(1) 700 nm+/−(2) 500 nm+/−(5) 4.5 nm+/−(6) 25 nm=1329.5 nm.

FIG. 14 shows a typical transmission through an optical circuit with different misalignments of the fibre to the grating. It can be seen that in the worst case, misalignment of 2.21 μm (y-axis) by 1.33 μm (x-axis) the penalty is around 1 dB. This demonstrates that the potential of passive alignment using this approach is valid.

The capping chip could be used as a non-CMOS compatible chip incorporating the process steps/materials not normally possible on a CMOS fabrication line. One example would be the formation of a Periodic Table Group III-V based light source. Periodic Table Group III-V material could be grown or bonded onto the capping chip to form the optical source which is then either in-plane coupled into a waveguide via an etched recess, or coupled via a grating directly or using the same mirror approach. FIGS. 15a and 15b show the in-plane coupling.

FIG. 16 shows part of third apparatus 150 of the present invention. The apparatus 150 has an alignment pin 152 with a chamfer or rounding 154. This may make it easier to get the two plates 156, 158 to fit together, potentially without affecting the alignment accuracy. The chamfers 154 may be more dramatic than shown in FIG. 16. The chamfer 154 on the pin 152 may be replaced by a point.

The apparatus of the present invention may also use aligning means in the form of a V-shaped alignment plug and a V-shaped alignment hole. This may lead to horizontal positioning inaccuracies which Would then need to be addressed.

It is to be appreciated that the embodiments of the invention described above with reference to the accompanying drawings have been given by way of example only and that modifications may be effected. Thus, for example, the optical device may be a laser instead of an optical fibre. The laser may be in the form of a ready processed laser die. If the light is emitted from an edge of the laser, laser-positioning means may be required. The laser-positioning means may be, for example, the above mentioned V-groove. A mirror may be used to redirect the light down onto a grating, with aligning means such for example as plugs or pins and complementary holes positioning required parts. If the light is emitted from a top surface of the laser, then the above mentioned elements may be used except for the mirror since the light will already be perpendicular to the waveguide surface. In another embodiment, an on-chip laser may advantageously be produced using a capping chip for non-CMOS compatible processes, i.e. growing/bonding and subsequent processing of Group III-V materials from the Periodic Table. Individual components shown in the drawings are not limited to use in their drawings and they may be used in other drawings and in all aspects of the invention.

The invention claimed is:

1. Apparatus comprising at least one optical device optically coupled to at least one waveguide on an optical chip, characterised in that:
   (i) the optical device is optically aligned with the waveguide by aligning means;
   (ii) the aligning means comprises at least one male member and at least one female member which locate together;
   (iii) one of the male member and the female member is positioned on the optical chip;
   (iv) the other one of the male member and the female member is positioned on a capping chip; and
   (v) the apparatus includes a mirror for reflecting light from the optical device to the waveguide.

2. Apparatus according to claim 1 in which the female member is positioned on the optical chip, and in which the male member is positioned on the capping chip.

3. Apparatus according to claim 1 in which the optical device is located in a groove in the capping chip.

4. Apparatus according to claim 3 in which the groove is a V-shaped groove.

5. Apparatus according to claim 1 in which the optical device is an optical fibre.

6. Apparatus according to claim 1 in which the optical device is a laser.

7. Apparatus according to claim 1 in which the male member is made of silicon nitride.

8. Apparatus according to claim 1 in which the optical device is coupled to the waveguide in the plane of the waveguide.

9. Apparatus according to claim 1 in which the optical device is coupled to the waveguide out of the plane of the waveguide.

10. Apparatus according to claim 9 and including a grating for coupling the optical device to the waveguide.

* * * * *